United States Patent Office 3,823,061
Patented July 9, 1974

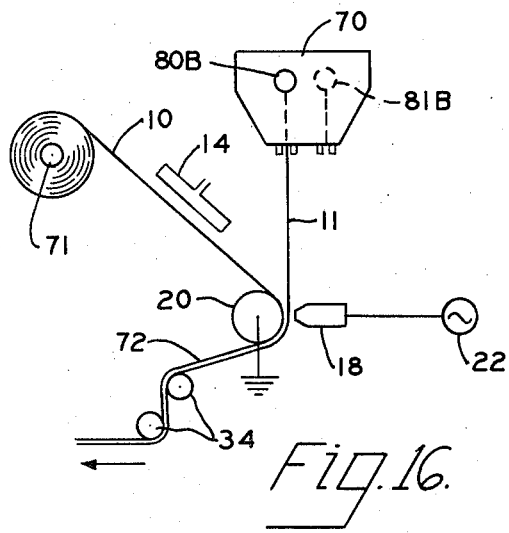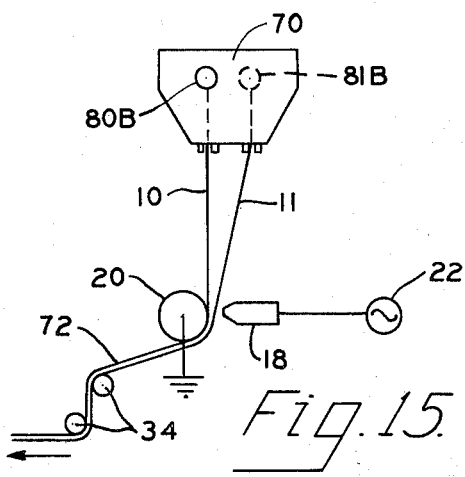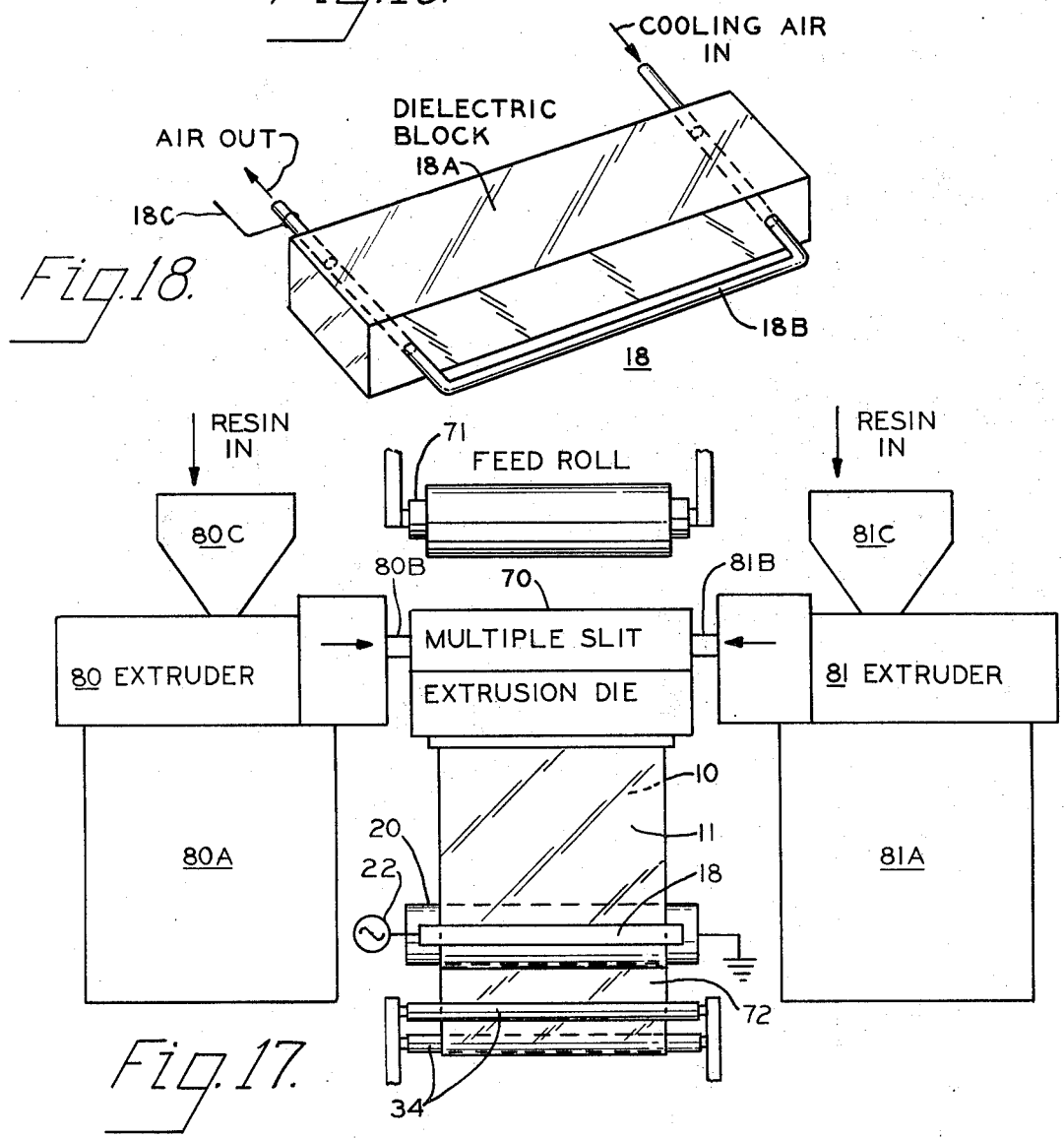

3,823,061
COMPOSITE BARRIER FILM AND METHOD OF MAKING THE SAME
Paul D. Frayer and H. Harald Lutzmann, Cleveland Heights, Ohio, assignors to Molecular Design Incorporated, Cleveland, Ohio
Continuation-in-part of abandoned application Ser. No. 152,436, June 11, 1971. This application June 2, 1972, Ser. No. 259,112
Int. Cl. B32b 27/08
U.S. Cl. 161—254                                     8 Claims

ABSTRACT OF THE DISCLOSURE

Two or more plastic films may be bonded together to form a composite sheet by subjecting them to a surface treatment comprising high voltage electric discharge of selected intensity, and then bringing the films together under pressure.

A preferred film suitable for use as a wrapping material comprises at least one layer of a polyolefin film and at least one layer of a film containing acrylonitrile polymer. Preferably the acrylonitrile polymer-containing film is a co-polymer of acrylonitrile and a rubber. Similarly, polyolefin films may be bonded to, respectively, nylon and polyester films. Two, three or more plies of film may be bonded together. All such composite films are formed by bonding together the polyolefin and other film layer or layers by means of the aforesaid corona discharge treatment.

A specified intensity of treatment is required; insufficient or excessive electrical treatment will cause poor adhesion between film layers. The two or more films may be corona-discharge treated at ambient temperature or at an elevated temperature. Generally, more intensive electric discharge treatment is required for films treated at a lower temperature as compared to treatment at a higher temperature. The films may be corona-discharge treated either immediately after manufacture of the films while they are still at an elevated temperature and have not yet cooled to ambient or room temperature, or earlier-made film may be heated prior to treatment. The two or more films may be treated separately, or treated simultaneously by a single electrode pair, and then formed into a single, multi-layered composite sheet.

---

This application is a continuation-in-part application to our earlier-filed application Ser. No. 152,436, filed June 11, 1971, now abandoned, and entitled "Composite Barrier Film and Method of Making the Same."

The present invention relates to laminated plastic sheets and to a method of making the same. More particularly, the present invention relates to a method of bonding layers of plastic film together by means of high voltage, electric corona discharge treatment, and to laminated plastic sheets made by such method. Although the invention is applicable to laminated plastic films in general, it has particular applicability to a laminated plastic film with excellent barrier properties, which is suitable for use as a packaging material for food, cosmetics and other products which are susceptible to attack or deterioration by moisture or oxygen.

A great variety of plastic films exist, each of which have widely differing properties of flexibility, impact strength, adhesion, permeability to moisture, oxygen, $CO_2$ and other gases, etc. It is often desired to obtain a sheet which combines the different properties of different films in a single material, and this is accomplished by laminating two or more films into a single sheet of material. For example, to select a single, simple example, nylon films have advantageous properties of high strength, toughness and clarity. However, they have inadequate adhesion or sealability characteristics, which limits their usefulness for packaging and similar applications. Accordingly, it is known to laminate a polyethylene film to a nylon film to form a polyethylene-nylon composite sheet. The polyethylene laminate side of the sheet is the side which is to be sealed, since polyethylene has excellent sealability characteristics.

The method by which the lamination of two or more dissimilar plastic films may be accomplished depends upon the adhesion characteristics of the films. Certain films may be laminated by the provision of a suitable adhesive layer between them. Other films may be laminated by heating them to near their softening temperatures, and applying pressure to the film to seal them together. In some cases, when it is desired to bond two films which will not adhere to each other, an intermediate film or several intermediate films may be employed which will adhere to one or both of the films to be laminated. For example, if a laminated sheet of film A and film B is sought, but film A will not adhere with sufficient strength to film B, a third film C, which will adhere to both A and B although A and B will not adhere to each other, may be interposed between A and B to serve as an adhesion film layer. There are obvious disadvantages to proceeding in this manner. The provision of an adhesive or an adhesion film layer increases its cost, the adhesive or adhesion film layer may have undesirable properties, such as undue stiffness or opacity, and the added expense of additional equipment and an additional manufacturing step is imposed.

The present invention, accordingly, provides a method of adhering two or more dissimilar films into a single sheet, which method is simple, inexpensive, and highly efficient. In accordance with the present invention, two or more dissimilar films are subjected to a surface treatment comprising a high voltage, electrical corona discharge, and the treated films are then brought together under pressure. This treatment results in a strong bond being formed between the films without the necessity of an intermediate adhesion layer. In the case of a composite or laminated sheet comprising three or more film layers, it may not be necessary to treat all the individual films. For example, assume that films A, B and C are to be laminated together, and film A will readily adhere to film B, but B will not adhere to film C. In such case, treatment only of films B and C in accordance with the invention is required so that the three films will adhere one to the other.

It is well known to treat plastic material, particularly polyolefins, as aforesaid, i.e., chemically, by flame, or by electric corona discharge, in order to enhance the bonding characteristics of the surface so that the polyethylene, polypropylene or other film would accept printing inks and other coating or printing materials. (See, for example, U.S. Pat. 2,910,723, issued Nov. 3, 1959 to G. W. Traver, and U.S. Pat. 2,859,481, issued Nov. 11, 1958 to W. S. Kaghan. These are typical of many such patents in the field.)

It is known to treat freshly extruded films with an activating gas such as oxygen, in order to increase the bonding strength between films, particularly when one film is a substantially non-polar material such as polyethylene, or when the film pair is one that will normally not bond, e.g., polyethylene-nylon. (See U.S. Pat. 3,339,-234, issued Sept. 5, 1967 to K. Utz.)

It is also known, for example, to treat polyvinyl butyryl plastic sheeting by electric discharge in a nitrogen atmosphere, to reduce the tendency of the polyvinyl butyryl sheeting to adhere to itself under pressure, as when stored in a roll. (See U.S. Pat. 3,407,130, issued Oct. 22, 1968 to R. B. Hailstone.)

Such treatment of individual plastic films for subsequent application of printing inks or other compounds, or for preventing adhesion of a sheet material to itself, or chemical gas treatment of dissimilar films to enhance adhesion between them, is not to be confused with the present invention which, as aforesaid, provides for the treatment by electric corona discharge of two or more films, and the bringing together of the films to form a bond between them, which bond, except for such treatment, would not form or would be significantly weaker.

Plastic films are often employed as wrapping materials for, among other things, meat, foodstuffs in general, candy, cosmetics, and other commodities, which are susceptible to deterioration by oxygen, moisture, carbon dioxide and other gases in the air. An important property of such packaging films or materials is their effectiveness in providing a barrier between the commodity to be protected and the air. Certain plastic films form better barriers in respect of certain gases than do others. For example, polymers or copolymers of olefinic nitriles are highly efficient barriers against the transmission of oxygen, carbon dioxide and nitrogen. They are, however, poor barrier materials insofar as the transmission of moisture is concerned. In short, olefinic nitrile polymer films are relatively permeable to moisture and impermeable to oxygen, carbon dioxide and nitrogen. Polyolefin films, on the other hand, such as polypropylene and polyethylene and copolymers thereof, while having excellent moisture barrier characteristics are quite permeable to oxygen, carbon dioxide and nitrogen. A laminated packaging material comprising a layer of e.g., acrylonitrile polymer and a polyolefin polymer would accordingly have highly desirable barrier characteristics, being relatively impermeable (as compared to other films) to moisture, oxygen, carbon dioxide and nitrogen.

Polyolefin and olefinic nitrile polymer films, however, cannot be bonded together in accordance with the prior art teaching except possibly with the provision of an intermediate adhesion film layer, since the two films do not adhere one to the other. In accordance with one aspect of the invention, therefore, a laminated sheet of polyolefin and olefinic nitrile polymer film is provided by subjecting polyolefin and olefinic nitrile polymer film to corona discharge and contacting the treated films under pressure to form a laminated sheet in accordance with the invention. The contacting pressure required is usually very slight.

Similarly, polyolefin films such as polyethylene and polypropylene, do not normally bond with either polyamide films such as nylon, or with polyester films such as polyterephthalates, at least not with sufficient strength to form a useable laminated plastic sheet. Therefore, in accordance with another aspect of the invention, a laminated sheet of polyolefin, particularly polypropylene or polyethylene, and a polyamide, particularly nylon, is provided by subjecting the polyolefin and polyamide films to corona discharge treatment and contacting the treated films under pressure to form a laminated sheet. In accordance with yet another aspect of the invention, a similar treatment is employed to form a laminated sheet comprising a polyolefin film and a polyester film. A polyamide (reaction product of diamines and dicarboxylic acids) film useful in the present invention is nylon-6. Polyester films useful in the present invention include polytetramethylene terephthalate and polyethylene terephthalate.

Another important desired characteristic of films, particularly those to be used in packaging and wrapping, is high impact and tear strength. The impact and tear resistance is important not only to provide a finished material of high strength, but to enable the material to be employed, for example, in automatic wrapping and packaging machines without tearing and jamming in the machine. Further, a certain amount of stiffness is required for film material to enable it to be guided into the various rollers and slots of automatic packaging or printing machinery and the like. Such high impact strength and stiffness is provided in a copolymer film of an olefinic nitrile, such as acrylonitrile, with an olefinic ester, such as ethyl acrylate, in the presence of a nitrile rubber. Such a polymer is disclosed, for example, in U.S. Pat. 3,426,102, issued on Feb. 4, 1969, to T. A. Solak et al. As described in that patent, the resulting polymer has the desired low permeability to gases and vapors and high impact strength. Solak et al. show that impact resistant polymers having low permeability to gases and vapors are prepared by polymerizing an olefinic nitrile such as acrylonitrile optionally with an olefinic ester such as ethyl acrylate in an aqueous medium in the presence of a nitrile rubber. These polymers may be prepared by polymerizing a major portion of an olefinically unsaturated nitrile, such as acrylonitrile, and a minor portion of an ester of an olefinically unsaturated carboxylic acid, such as ethyl acrylate, in the presence of a preformed rubberized co-polymer composed of a major proportion of a conjugated diene monomer, such as butadiene, and a minor proportion of olefinically unsaturated nitrile, such as acrylonitrile. While rubberized olefinic nitrile-olefinic ester copolymers as described above are preferred materials for use in the present invention, other forms may of course be used, including non-rubberized olefinic nitrile-olefinic ester films. Therefore, in accordance with a more limited aspect of the invention, a laminated-film sheet comprises a polyolefin film laminated to a rubberized olefinic nitrile-olefinic ester polymer, preferably a rubberized olefinic nitrile-olefinic ester polymer in accordance with the Solak et al. patent. Olefinic ester-olefinic nitrile-resins are available under the trade names Barex (Vistron Corporation, a subsidiary of the Standard Oil Company), Lopac (Monsanto Chemical Company) and XT-Acrylic Multi Polymer (American Cyanamid Company). (Films made from these resins are subsequently referred to herein simply by the resin trade names, i.e., Barex, Lopac and XT-AMP. The Barex films referred to in the examples are rubberized Barex films as disclosed in the above-mentioned Pat. 3,426,102.) An olefinic nitrile content of at least fifty percent (50%) by weight in the olefinic ester-olefinic nitrile film is preferred. For example, at least fifty percent (50%) by weight acrylonitrile or substituted acrylonitrile in the nitrile film to be laminated to the polyolefin film is preferred.

Another advantage enjoyed by the olefinic nitrile-polyolefin laminate is its relatively low cost as compared to other films, and the fact that it contains no chlorine or other halogens. Heretofore, the excellent barrier properties of the acrylonitrile-polyolefin laminates of the invention were approached only by films containing chlorinated polyolefins, such as polyvinylidene chloride. Plastic packaging materials are a disposable item, and incineration of chlorinated polyolefins results in the formation of toxic hydrogen chloride and other chlorinated gases. A rubberized olefinic nitrile (e.g., acrylonitrile)-polyolefin composite film, upon being incinerated, does not form toxic chlorinated gases. Accordingly, it is yet another object of the invention to provide a disposable plastic packaging material of excellent barrier characteristics which will not yield toxic gases upon incineration.

As hereinabove stated, it is often desirable to laminate two, three, or more plastic films into a single laminated plastic sheet. Depending on the nature of the various plastic films involved, one or more of the film pairs to be laminated together may require electrostatic corona discharge treatment in accordance with the invention, in order to attain satisfactory adhesion between the adjacent films. Since in every case, at least two films must be subjected to electrical corona discharge treatment, they may be treated in separate electrodes. However, this requires duplicate sets of electrodes and, especially in cases where more than two films require treatment, the provision of multiple electrode pairs becomes expensive. In accordance with another aspect of the invention, therefore, multiple plastic films may be treated simultaneously by a single electrode pair to provide the necessary adhesion characteristics.

The intensity of electrical corona discharge treatment to which the film is exposed has been found to be critical in obtaining the maximum adhesion strength between the two films to be laminated one to the other. By intensity of treatment is meant the total power input to the treating electrodes and the time of exposure of the film to the corona discharge. It has been found that for a given combination of films, a given range of intensity of electric discharge treatment will provide the maximum adhesion strength between two given films, whereas an amount of treatment less than the optimum amount will result in weaker adhesion, and an amount of treatment in excess of the critical amount will similarly result in a loss of adhesion strength. That is to say, there is a range of electrostatic treatment intensity which provides optimum results, and treatment of intensity below that range, or of an intensity beyond that range, will result in poor adhesion between the films, as compared to adhesion obtained by treatment within the critical range. Therefore, in accordance with another aspect of the invention, the critical range of electrical discharge intensity for a given combination of films is established to obtain maximum adhesion strength between them.

In applying the electrostatic corona discharge treatment of the invention to newly extruded film, the electrical discharge treatment may be applied to the film before it is drawn to its final thickness. That is to say, the electrical discharge treatment may be applied to the film at a point where it is 1 mil in thickness and after the treatment the film is drawn to its final thickness of ½ mil. It has been found that such drawing after the electric corona discharge treatment tends to offset the effect of the treatment. Therefore, in accordance with yet another aspect of the invention, if electric corona discharge treatment is applied prior to completion of drawing of the film, the intensity of treatment may be increased beyond the optimum amount for maximum adhesion strength, and the nullification of the electrical corona discharge treatment effect by the subsequent drawing of the film is utilized to reduce the net electric corona discharge treatment effect to within the critical maximum effective range.

It has been further found that electrical corona discharge treatment of films at elevated temperatures is more efficient than treatment of the same films at ambient, or lower, temperatures. In other words, a less intense electrostatic discharge treatment will impart the same adhesion properties to film treated at a higher temperature than to film treated at a lower temperature. In accordance with another aspect of the invention, therefore, two or more films are treated by electrical corona discharge at elevated temperature, or at controlled temperatures to standardize the intensity of treatment at a given electrical setting.

The film to be treated may be previously manufactured film which is advantageously heated to an elevated temperature close to its softening point prior to the corona discharge treatment. Alternatively, and preferably, the film to be treated is newly extruded or newly formed film which is subjected to the corona discharge treatment while still at an elevated temperature from its manufacturing process, that is to say, the film is treated before it has had an opportunity to cool from its manufacturing temperature, i.e., the temperature at which it is extruded, cast or blown, to substantially below its softening temperature. A laminated sheet may also be made from a newly extruded film and a previously manufactured film, both of which are subjected to corona discharge treatment.

The bonding strength of the film and the effectiveness of the electrical treatment is also enhanced by bringing the films into contact at an elevated temperature. Normally, the films are bonded together immediately after the electrical discharge treatment so that they are still at the elevated temperature at which the electrical treatment was carried out. However, in some cases it may be desired to electrically treat the films, place them in storage and then contact them to form the laminated or composite sheet at a later time. It has been found that the surface effect of the electrical discharge treatment is permanent, or at least long lasting, since the films treated in accordance with the invention with electrical corona discharge have been contacted one month and six months after such treatment with excellent results. Such aged, treated films are heated to the desired elevated temperature prior to being brought into contact. Therefore, in accordance with yet another aspect of the invention, two or more films are subjected to electric corona discharge treatment and are then placed in storage. Subsequently, the films are heated to an elevated temperature and brought into contact to form a laminated sheet. Naturally, one or more of the films of the laminate may be an aged, treated film, and one or more of the films of the laminate may be a freshly treated film.

It is therefore an object of the invention to provide a method of bonding two or more dissimilar plastic films to each other by treating the films with high voltage corona discharge and bringing the treated films together under pressure to form a laminated sheet of two or more films.

It is another object of the present invention to provide a method for simultaneously treating a multiplicity, i.e., two or more plastic films, in like manner to form a multi-layered composite sheet.

It is yet another object of the invention to provide a method of providing electrostatic treatment to a plurality of plastic films by means of a single electrode pair.

It is another object of the invention to provide an olefinic nitrile, olefinic ester film-polyolefin film laminated sheet.

It is yet another object of the invention to provide an acrylonitrile film-polyolefin film laminated sheet.

It is yet another object of the invention to provide a polyolefin-polyamide laminated sheet, e.g., a polyethylene-nylon sheet, and a polypropylene-nylon sheet.

It is still another object of the invention to provide a polyolefin-polyester laminated sheet, e.g., a polyethylene polyterephthalate sheet, and a polypropylene-polyterephthalate sheet.

Other objects and advantages of the invention will become apparent from the following detailed description. The invention may take form in certain parts and arrangements of parts, preferred embodiments of which are described in detail in the specification and in the accompanying drawings, wherein:

FIG. 15 is a schematic diagram in elevation showing treatment of two films co-extruded from a multiple slit die;

FIG. 16 is a schematic diagram in side elevation showing treatment of an extrusion coated laminate;

FIG. 17 is a schematic diagram in side elevation showing treatment of two films co-extruded from a multiple slit die fed by extruders; and FIG. 18 is a schematic perspective view of an electrode useable in accordance with the invention.

The bonding properties of a film, such as polyethylene or polypropylene film, are dependent upon the nature of the surface of the film. The electrical corona discharge treatment in accordance with the invention affects the surface of the films to be bonded, whereby the adhesive strength between them is greatly increased, so that two or more films previously unbondable or only weakly bondable together may be bonded with sufficient strength to serve as a laminated sheet. Treatment in accordance with the invention also has the incidental effect of increasing in the known manner the printability or coatability of plastic films treated in accordance with the invention.

While the precise nature of the change which takes place on the surface of the treated film is not known with certainty, numerous theories have been advanced concerning the effect of the treatment on the chemical structure and cross linkage of the surface molecules of the plastic film. A convenient method exists, however, for measuring the degree of the surface treatment undergone by film, by simply measuring the wettability of the surface by a standard liquid. The wettability of a film may be conveniently measured by measuring the characteristic contact angle formed between a standard liquid and the surface of the film. The change in surface properties of the treated film may thus be conveniently measured by measuring the contact angle of a standard liquid on the film, both before and after treatment. The intensity of treatment may therefore be expressed in terms of contact angle between the film and the standard liquid. Any suitable test liquid may be employed. For example, for polyethylene film, a formamide-Cellosolve liquid may be employed, or ordinary distilled water may be used. The test liquid is simply applied with a swab to a small area of the film, and the angle of contact between the film and the droplets of liquid is measured by any convenient means.

Figure 1:
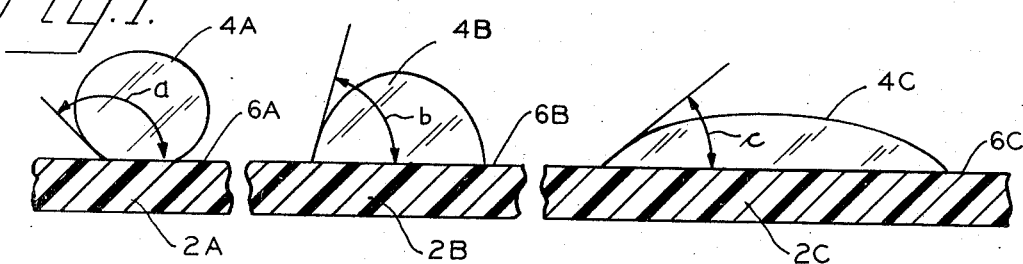
FIG. 1 shows a diagrammatic cross section of three sections of film, each containing a drop of liquid thereon.

Referring now to FIG. 1, there is shown in diagrammatic enlarged cross sectional view three sections of film material 2A, 2B and 2C. On the surface of each respective segment of film is shown a drop of liquid indicated, respectively, 4A, 4B and 4C. The contact angle between the drop of liquid and the surface of the film is shown, respectively, as the angles a, b and c. Contact angle a is an obtuse angle and shows that the film surface 6a is relatively non-wettable, i.e., the liquid drops tend to ball up to a small area of contact between liquid and film, relative to the volume of the drop 4A. The contact angle b shows that the film surface 6b is relatively more wettable than the surface 6a, but less wettable than the surface 6c, contact angle c being the smallest of the three angles a, b and c. Increased electric corona discharge treatment in accordance with the invention tends to increase the wettability of the surface, and decrease the contact angle. Accordingly, the degree of treatment of a given film is conveniently measured and referred to in terms of the measure, in degrees, of its contact angle. The contact angle is seen to be that formed between the surface of the film under a drop of liquid and a line taken tangent to the surface of the drop of liquid at its point of contact with the film.

While the required degree of adhesion between the films of a laminate sheet may vary depending on the application in which the sheet is to be employed, it is generally accepted practice to designate a peel strength of 400 grams or more as satisfactory, and a peel strength of less than 400 grams as unsatisfactory. It will be recognized that this is an arbitrary value selected for convenient reference, but it generally comports with practice in the industry. The peel strength is the force in grams required to separate a one-inch wide strip of one film from the other at room temperature. Accordingly, all references in the specification and claims to a peel strength in grams are based on a one-inch wide strip of laminated sheet, tested at room temperature (72° F.).

The peel strength of, for example, a Barex film, the above-mentioned rubberized acrylonitrile polymer, with polyethylene film is effectively —O—, the two films being non-bondable. However, in accordance with the invention, upon both the films being subjected to a suitable degree of electric corona discharge treatment, the two films may be bonded together under pressure without the use of an adhesive or intermediate adhesive layer film. Both the polyethylene film and the Barex film are treated by electric corona discharge and preferably both films will be treated simultaneously, that is, by a single electrode pair to make the desired laminated sheet.

In some cases it is possible to attain significant adhesion between two normally non-adhesive films by subjecting only one of the films to electric discharge treatment. However, in such a case the intensity of treatment required for the film is so high as to be impractical on a commercial basis. A laboratory treatment of polypropylene film to a water contact angle of 45°, for example, will provide excellent adhesion of the film to an untreated rubberized Barex film, as shown in one of the examples set forth below. It is not commercially feasible however, to treat polypropylene to such a low contact angle.

The following Examples I, II and III, electrical corona discharge treatment of intensity sufficient to engender the contact angle changes indicated was applied to the treated film at 64° C. The film was then heated to 120° C. and contacted at a contact pressure of one pound per square inch. A brief pressure-contact time, less than one second, was sufficient to attain final adhesion strength. Extending the pressure-contact time to thirty seconds did not increase the final adhesion strength. Contact angles are with distilled water.

EXAMPLE I

XT-AMP, polypropylene

| | Contact angle (water) | | |
|---|---|---|---|
| Polypropylene film, degrees | [1] 92 | [1] 92 | 50 |
| XT-AMP film, degrees | [1] 63 | 45 | 45 |
| Peel strength, grams | 11.1 | 5.5 | 379 |

[1] Untreated film.

EXAMPLE II

Acrylonitrile-Butadiene-Styrene copolymer (Marbon Cycolac) Polypropylene

| | Contact angle (water) | | |
|---|---|---|---|
| Polypropylene film, degrees | [1] 92 | [1] 92 | 50 |
| ABS film, degrees | [1] 65 | 35 | 35 |
| Peel strength, grams | 8.1 | 8.1 | 560 |

[1] Untreated film.

EXAMPLE III

Lopac, polypropylene

| | Contact angle (water) | | |
|---|---|---|---|
| Polypropylene film, degrees | [1] 92 | [1] 92 | 50 |
| Lopac film, degrees | [1] 65 | 35 | 35 |
| Peel strength, grams | 9.3 | 13.3 | 467 |

[1] Untreated film.

Figure 2:
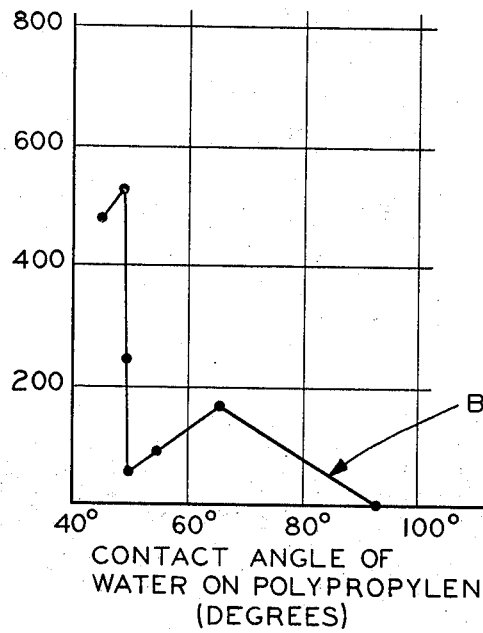
FIG. 2 is a graph which plots the peel strength in grams of a one-inch wide strip of polypropylene-Barex laminated sheet against the contact angle, in degrees, of water on polypropylene; the untreated Barex has a 65° contact angle with water. The term "contact angle" is explained hereinbelow.

Example IV, following, shows the result of treating polypropylene film with varying degrees of intensity of electric corona discharge treatment and applying the film to an untreated Barex film. The degree or intensity of the treatment of the polypropylene film is measured in terms of the contact angle of distilled water on the polypropylene. The untreated Barex film displays a contact angle of 65° with distilled water. The results of Example IV are plotted in FIG. 2 which shows the peel strength in grams (on a one-inch strip basis, as hereinabove defined) plotted against the contact angle of distilled water on polypropylene. The quite narrow critical range of treatment required to attain a satisfactory peel strength (over 400 grams) is shown. Also shown is a partial recovery of peel strength beyond the critical range, but this recovery is generally unsatisfactory.

Figure 6:
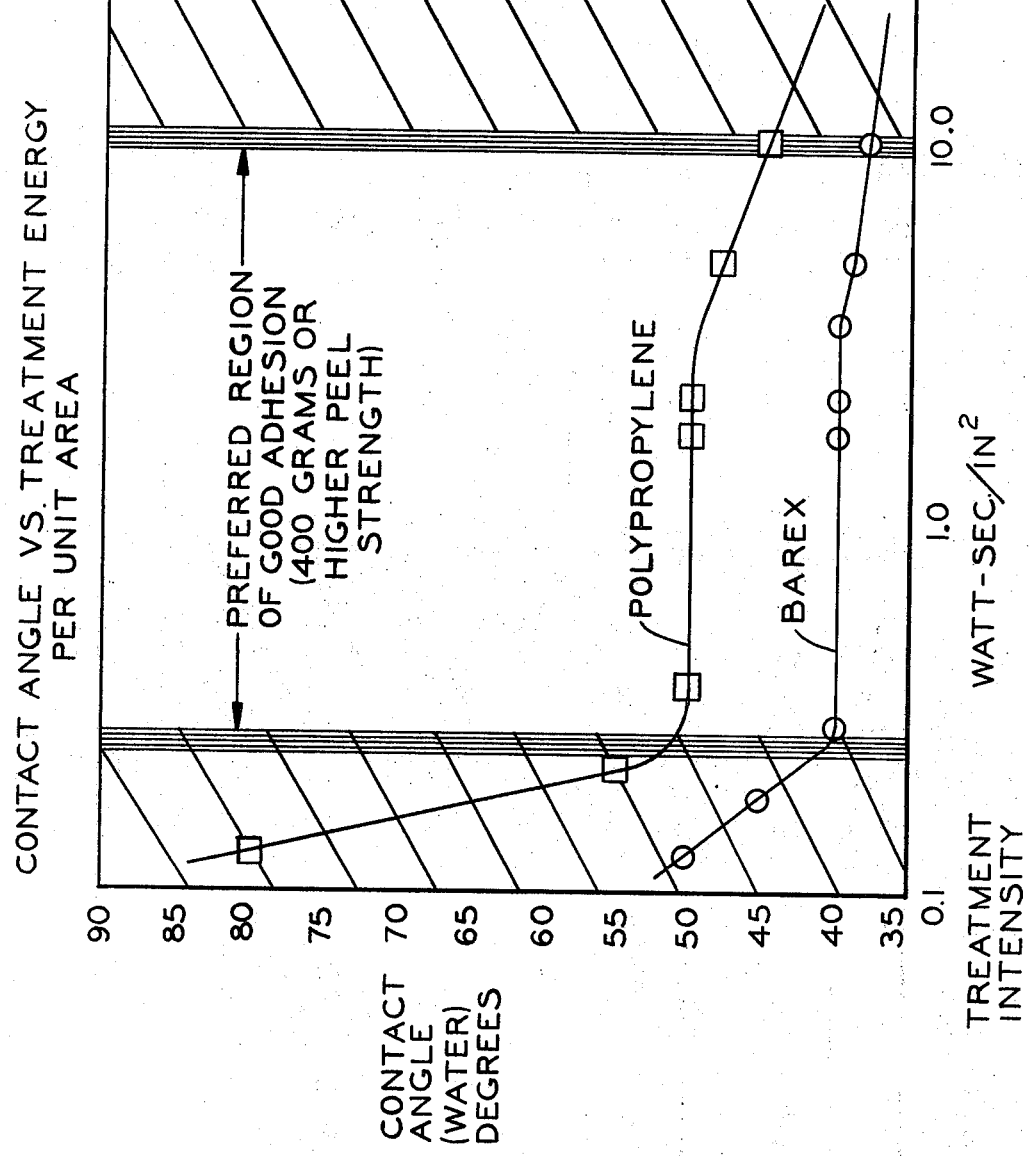
FIG. 6 is a graph which plots the contact angle of water on a plastic film against the electric corona discharge treatment in watt/seconds per square inch to which the film has been subjected—values are shown for polypropylene film and for Barex film.

As hereinabove stated, treatment of polypropylene to a contact angle with distilled water of much less than about 50° is generally not commercially feasible. In the laboratory this degree of treatment, e.g., to 48°, required numerous passes of the polypropylene through the corona discharge. A critical contact angle exists beyond which the intensity of treatment required to attain a given decrease in contact angle increases rapidly. This is further described below with reference to FIG. 6. FIG. 6 shows that for polypropylene, the critical angle occurs at below about 50° and the treatment energy input required for each succeeding one degree decrease in contact angle below 50° increases sharply.

Examples V, VI, VII and VIII show the peel strength obtained by laminating treated polypropylene and treated Barex. (Unless otherwise specified in this specification and claims, the terms "treated" and "untreated" means surface treatment by electric corona discharge treatment in accordance with the invention.)

EXAMPLE IV

Untreated Barex, treated polypropylene

| | Contact angle (water) | | | | | | |
|---|---|---|---|---|---|---|---|
| Polypropylene film, degrees | 45 | 48 | 49 | 50 | 57 | 65 | 92 |
| Barex film (untreated), degrees | 65 | 65 | 65 | 65 | 65 | 65 | 65 |
| Peel strength, grams | 480 | 520 | 250 | 60 | 90 | 160 | 0 |

EXAMPLE V

Treated Barex, treated polypropylene

| | Contact angle (water) | | | | | | |
|---|---|---|---|---|---|---|---|
| Polypropylene film, degrees | 45 | 48 | 49 | 57 | 65 | 92 | |
| Barex film, degrees | 50 | 50 | 50 | 50 | 50 | 50 | |
| Peel strength, grams | 140 | 290 | 90 | 90 | 90 | 0 | |

EXAMPLE VI

Treated Barex, treated polypropylene

| | Contact angle (water) | | | | | |
|---|---|---|---|---|---|---|
| Polypropylene film, degrees | 45 | 48 | 51 | 57 | 65 | 92 |
| Barex film, degrees | 40 | 40 | 40 | 40 | 40 | 40 |
| Peel strength, grams | 200 | 390 | 350 | 170 | 260 | 0 |

EXAMPLE VII

Treated Barex, treated polypropylene

| | Contact angle (water) | | | | | | |
|---|---|---|---|---|---|---|---|
| Polypropylene film, degrees | 45 | 48 | 50 | 51 | 55 | 65 | 92 |
| Barex film, degrees | 39 | 39 | 39 | 39 | 39 | 39 | 39 |
| Peel strength, grams | 450 | 720 | 550 | 480 | 400 | 10 | 0 |

EXAMPLE VIII

Treated Barex, treated polypropylene

| | Contact angle (water) | | | |
|---|---|---|---|---|
| Polypropylene film, degrees | 45 | 48 | 65 | 92 |
| Barex film, degrees | 38 | 38 | 38 | 38 |
| Peel strength, grams | 130 | 480 | 40 | 0 |

Figure 3:
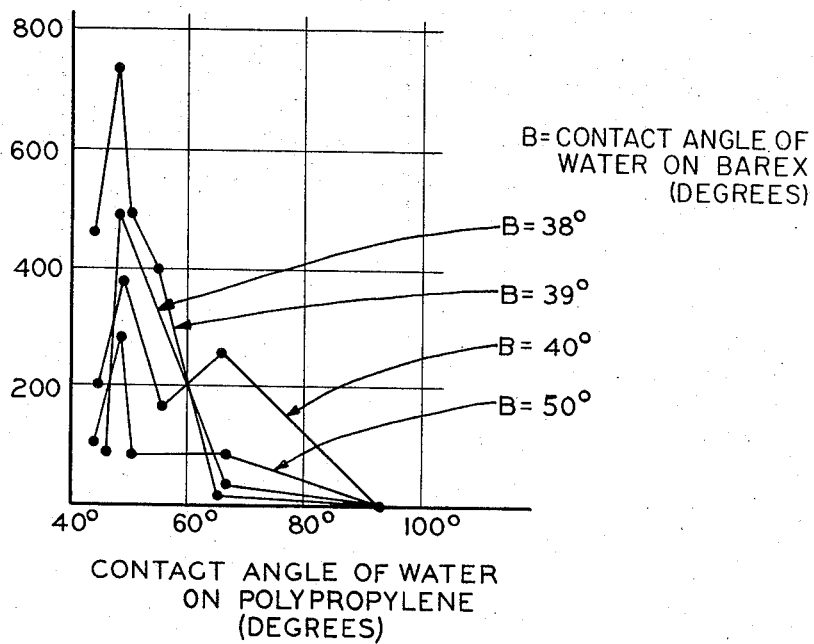
FIG. 3 is a graph similar to FIG. 2 which plots the peel strength in grams of various one-inch strips of polypropylene-Barex laminated sheet against the contact angle, in degrees, of water on polypropylene, the different degrees of treatment of the Barex film samples being shown as the contact angle, in degrees of water on Barex.

The results of Examples V, VI, VII and VIII are plotted in FIG. 3.

The following data is taken from the graph of FIG. 3.

| | Contact angle (water), degrees | |
|---|---|---|
| Minimum peel strength, grams | Polypropylene | Rubberized acrylonitrile-olefinic ester copolymer |
| 200 | 40–60 | 38–50 |
| 400 | 45–55 | 38–40 |

Figure 4:
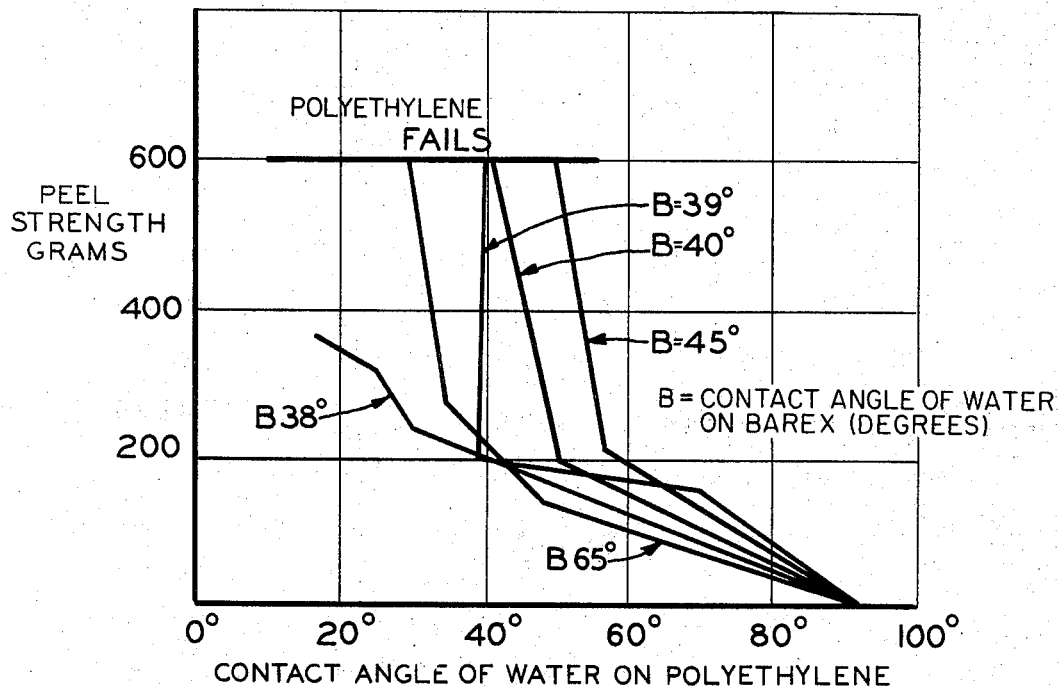
FIG. 4 is a graph similar to FIG. 2 which plots the peel strength in grams of various one-inch wide strips of polyethylene-Barex laminated sheet against the contact angle in degrees of water on polyethylene, the different degrees of treatment of the Barex film samples being shown on the graph as contact angle, in degrees, of water on Barex.
Figure 5:
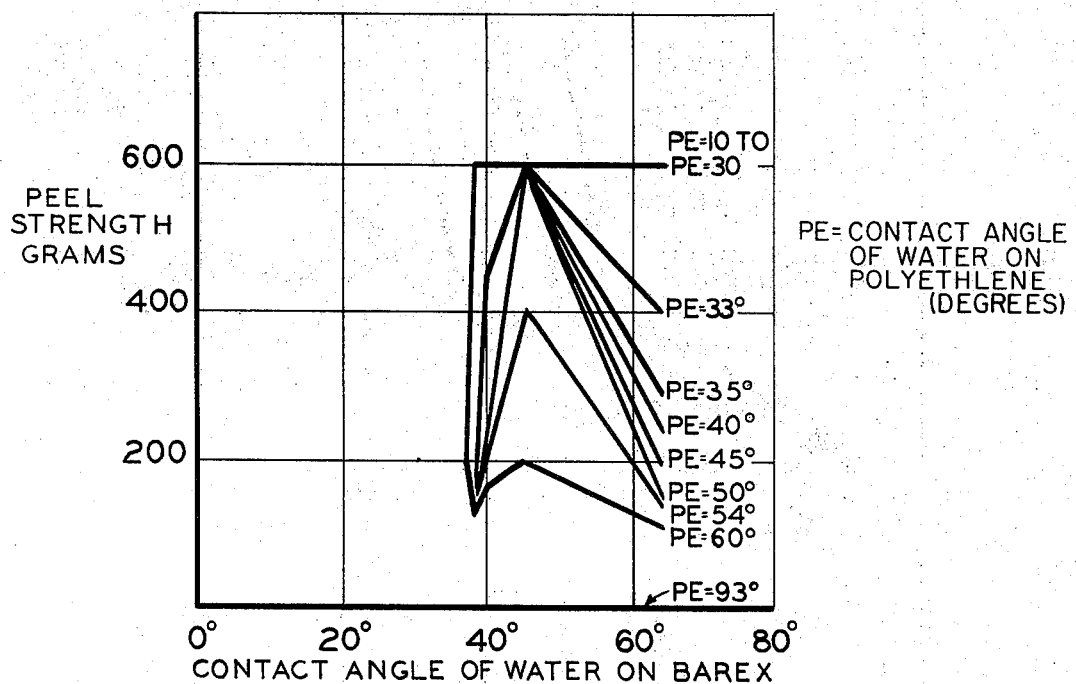
FIG. 5 is a graph similar to that of FIG. 4 which plots the peel strength in grams of a one-inch wide strip of laminated sheet against the contact angle in degrees of water on Barex.

Similar testing of treated polyethylene and treated Barex film is plotted in FIGS. 4 and 5. FIG. 4 plots the peel strength in grams against the contact angle of water on polyethylene for a series of treated Barex films. The degree shown for each of the Barex lines is contact angle of distilled water on treated Barex. FIG. 5 plots peel strength against contact angle of distilled water on Barex for various polyethylene films, treated to the degree indicated by their contact angle with water shown for each of the polyethylene lines on the graph.

The following data is taken from the graphs of FIGS. 4 and 5.

| | Contact angle (water), degrees | |
|---|---|---|
| Minimum peel strength, grams | Polyethylene | Rubberized acrylonitrile-olefinic ester copolymer |
| 200 | 10–60 | 38–64 |
| 400 | 10–55 | 38–64 |

As shown in the Examples and in the data plotted in the various Figures, a critical range exists for the intensity of treatment of each of the two films of the laminate wherein maximum peel strength is obtained.

The effect of under- or overtreatment is clearly shown in FIG. 6, in which the contact angle in degrees with distilled water of the treated film is plotted against the relative degree of treatment, which is shown on the ordinate of the graph in watt-seconds per square inch of treated film. It is shown that a degree of treatment between about 0.3 and 10.0 watt-seconds per square inch for both films results in a laminate between the polypropylene and Barex films which had good adhesion properties i.e., peel strength of over 400 grams. Undertreatment or overtreatment of either or both the films as indicated by the graph results in poor adhesion, i.e., a peel strength of below 400 grams. Naturally, many other combinations of intensity of treatment of the films (they need not be treated with equal intensity) will result in good adhesion.

In a test conducted on newly manufactured film, newly extruded Barex was highly treated to a contact angle of 38° and laminated with polyethylene treated to a contact angle of 38°, both contact angles being measured with distilled water. The resultant adhesion was poor, i.e., less than 400 grams peel strength. Another sample of newly extruded Barex was highly treated to a contact angle of 38° and subsequently drawn a factor of 100%. That is to say, after electric corona discharge treatment, the Barex was drawn over a roll which reduced its film thickness to one-half of its value prior to drawing. The contact angle was subsequently measured and found to be 53°. This Barex was laminated with polypropylene treated to a contact angle of 38° and excellent adhesion, over 600 grams peel strength, was obtained.

The effect of temperature during or immediately after treatment of the film is that the higher the temperature, the greater is the surface effect attained by a given intensity of electric corona discharge treatment. For example, treatment of Barex film at 20° C., with a given intensity of electric corona discharge treatment results in a contact angle with distilled water of 50°. Identical intensity of treatment of Barex film at 65° C. results in a contact angle with water of 39°.

Figure 8:
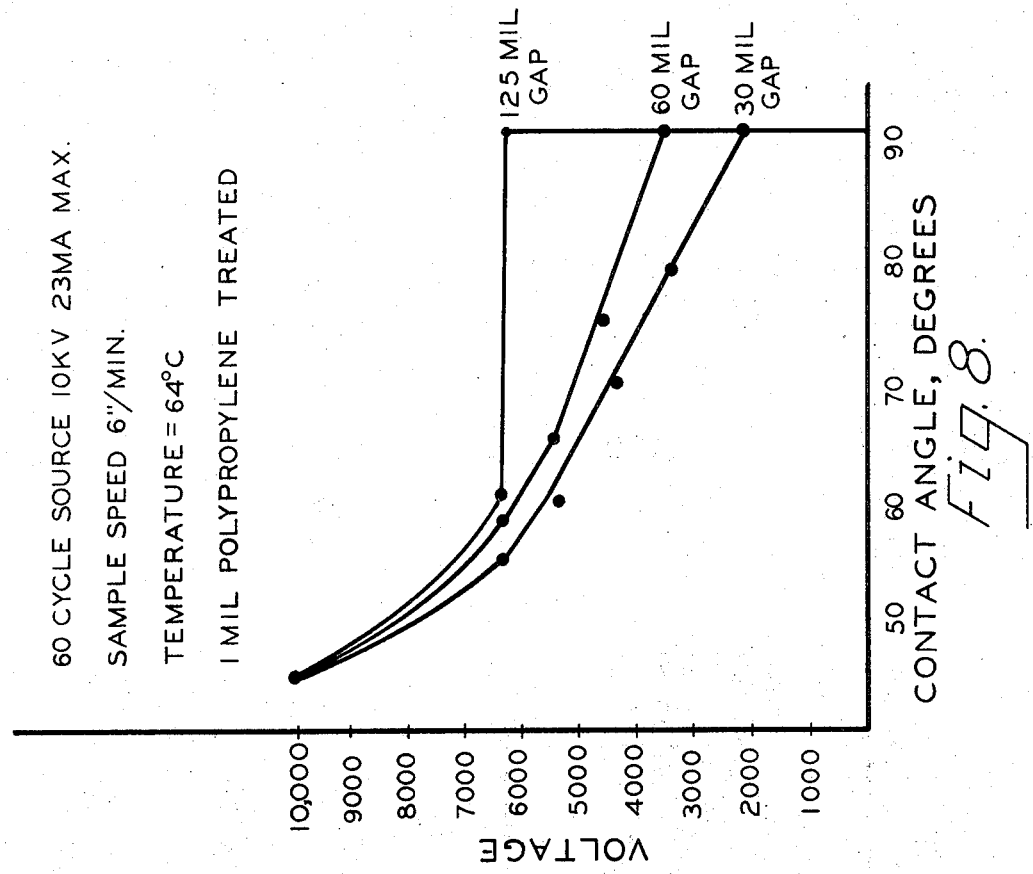
FIG. 8 is a graph plotting the voltage at onset of visible corona discharge against the contact angle attained for various gap settings of the electrode.
Figure 7:
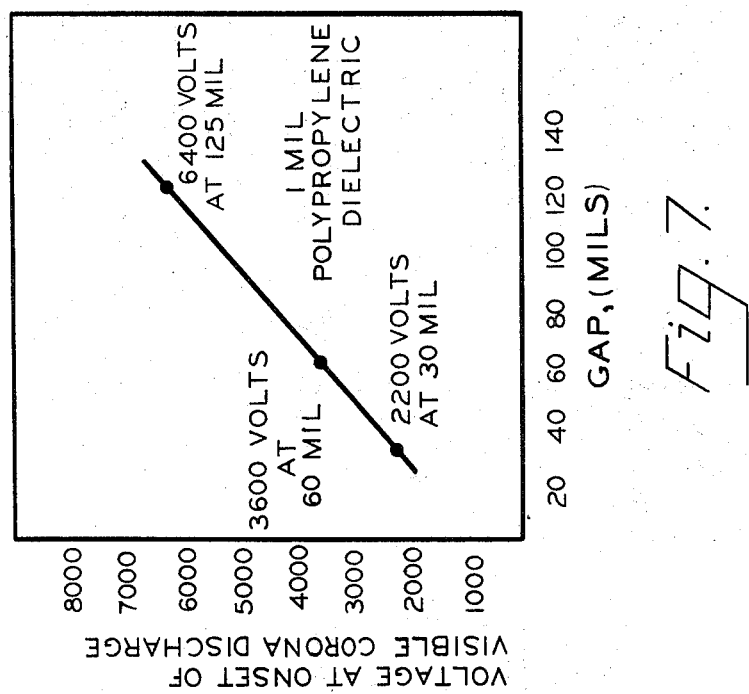
FIG. 7 is a graph plotting the voltage at onset of visible corona discharge against the electrode gap in mils for a one-mil thick polypropylene film.

As would be expected, the intensity of electric treatment is determined by the wattage input into the electrode pair, the speed of film travel (which of course determines the residence time of the film within the corona discharge), the thickness of the film, and the gap between the electrode and the film. In FIG. 7, the voltage across the electrodes is shown at the onset of visible corona discharge in air, plotted against the electrode gap measured in mils, for one mil polypropylene film. FIG. 8 is a plot of voltage versus contact angle with water in degrees at various gap settings for the electrode for one mil polypropylene treated with electrodes connected to a 60 cycle, 10 kilovolt source, at a film speed past the electrodes of 6 inches per minute at 64° C.

Figure 9:
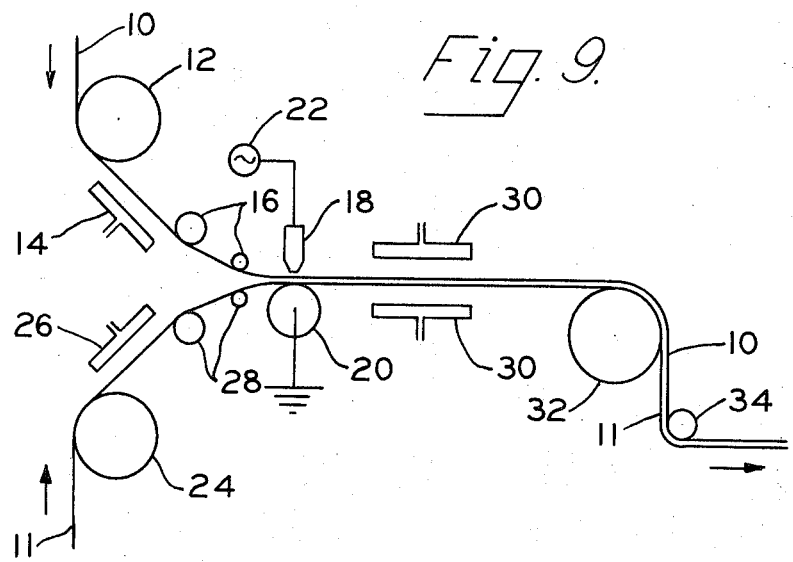
FIG. 9 is a schematic diagram in elevation showing one manner of treatment of plastic films in accordance with the invention.
Figure 12:
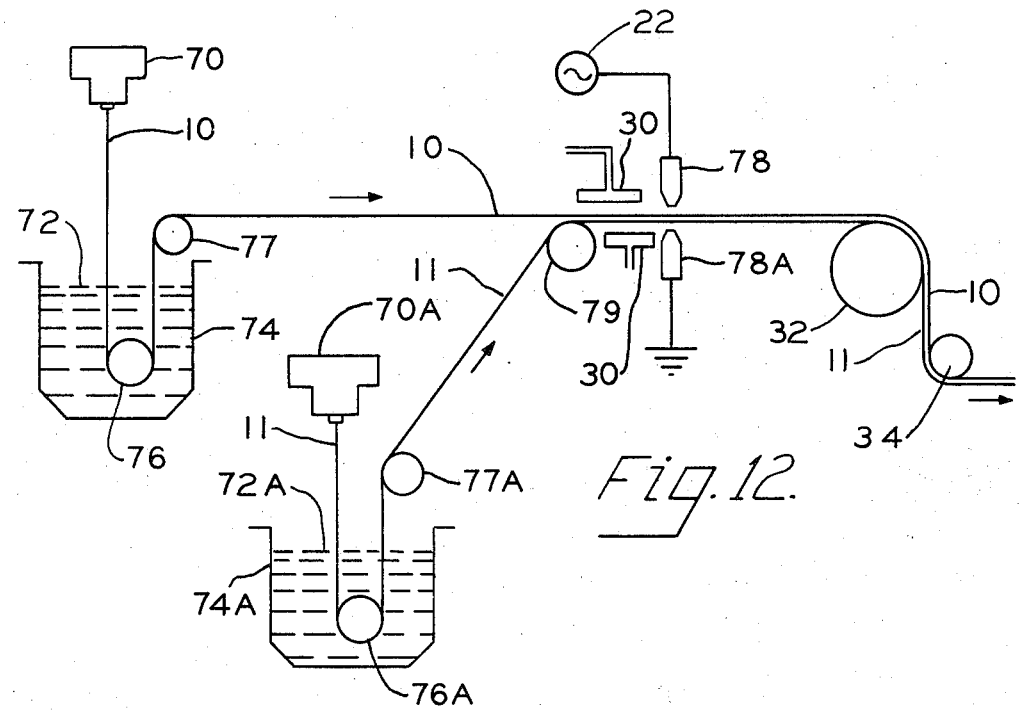
FIG. 12 is a schematic diagram in elevation showing the manner of treating newly made plastic films in accordance with the invention.

As hereinabove stated, both or all of the films to be bonded together may be subjected to electric corona discharge treatment in accordance with the invention. It is preferred that both or all the films be treated, although in a given case it may not be necessary to treat all the films. For example, referring now to FIG. 9, a first film 10, is passed over roller 12 and heated by a heater 14 to a temperature somewhat below its softening temperature. Guide rollers 16 guide the film to between an electrode pair formed by electrode 18 and ground roller 20. The electrode is connected to a suitable high voltage source 22 of alternating current. The voltage is sufficient to form a corona discharge between the tip of electrode 18 and ground roller 20. A second film, 11, is passed over roller 24 and heated by heater 26. Guide rollers 28 similarly guide the film into the corona discharge existing between electrode 18 and ground roller 20. Supplemental heaters 30 further heat the film to enhance the electric treatment effect and the film is drawn over draw roller 32 with enough force to press the two films together, whereby they adhere one to the other. Generally, a minimum amount of force is required to press the films together over the roller and any force sufficient to draw the film across the various rollers will suffice. A guide roller 34 directs the film to a take-up reel, not shown. As illustrated in FIG. 12, heating of the film may be carried out both prior to and subsequent to the corona discharge treatment, and in both cases will enhance the effect of electrical treatment; the post electrical treatment heating is carried out directly after application of the corona discharge. The embodiment of FIG. 12 shows simultaneous treatment of two films.

Figure 10:
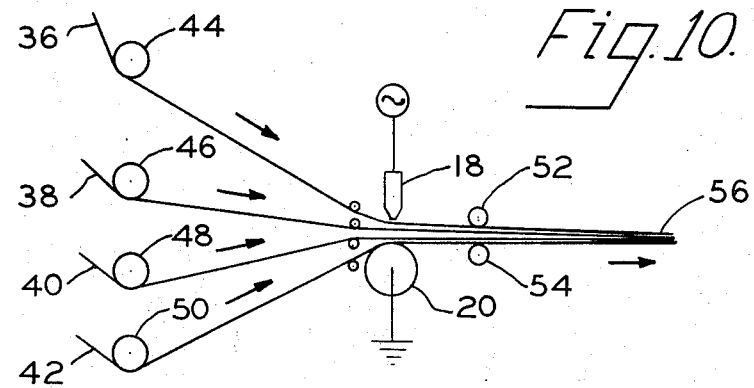
FIG. 10 is a schematic diagram in elevation showing another manner of treatment of plastic films in accordance with the invention.
Figure 13:
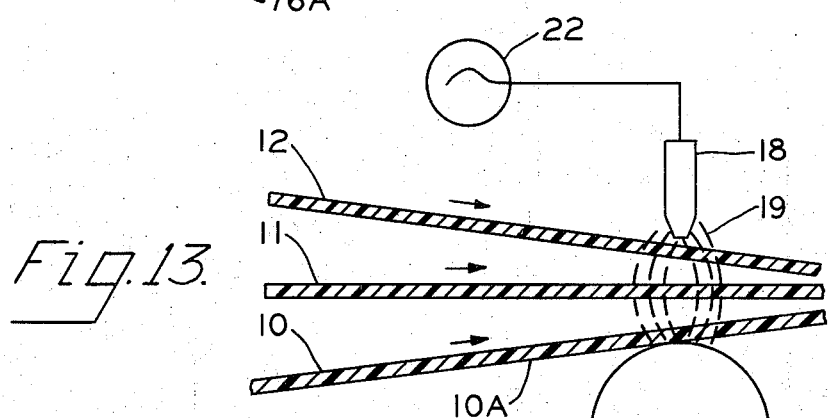
FIG. 13 is a schematic diagram in elevation showing the simultaneous treatment of three films in accordance with the invention.

FIG. 10 shows simultaneous treatment of four films 36, 38, 40 and 42, passing over their respective guide rollers 44, 46, 48 and 50. The four layers of film are passed through a corona discharge formed between electrode 18 and ground roll 20 and the treated films are then passed between pressure rolls 52 and 54, to form a laminated plastic sheet 56. In any of the embodiments shown, the grounded roller may be replaced by a nonroller electrode, i.e., in lieu of a single electrode and ground roller there may be provided a pair of electrodes. The effect is the same and generally providing the ground electrode in the form of a roller is convenient in treating films and is a well known expedient in the art. While the simultaneous method of treatment of films illustrated, e.g., in FIGS. 10, 12 and 13 is preferred, because of its simplicity, it is possible to treat films separately as shown, e.g., in FIG. 11.

This may be required where different intensities of treatment for the two or more films are required. It should be noted that the intensity of treatment between the individual films can be varied, even with a single electrode pair apparatus, by heating the different films independently to different temperatures.

Figure 11:
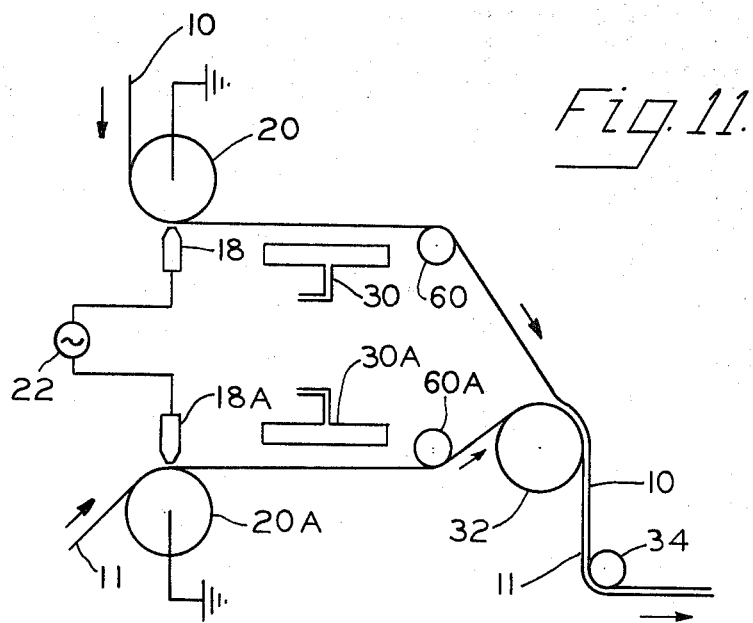
FIG. 11 is a schematic diagram in elevation showing the treatment of plastic films in accordance with the invention by separate electrode pairs.

Referring now to FIG. 11, a film 10 is seen to be passed over a grounded roller 20 and subjected to a corona discharge between roller 20 and electrode 18, which is connected to a high voltage alternator source 22. The treated film is then heated by a supplemental heater 30, passed over a guide roll 60 towards a drawing roll 32. A second film 11 is passed over a similar grounded roller 20A and through a corona discharge obtained between electrode 18A which is also connected to a high voltage alternator source, and the grounded roll 20A. The treated film is then heated by a supplemental heater 30A, passed over a guide roll 60A, and to a drawing roll 32, where the two films are drawn together with sufficient force to adhere them one to the other. A guide roller 34 directs the laminated sheet to a take-up reel not shown. As illustrated in the above diagrammatic figures, an existing film or films may be heated for treatment. Conversely, a freshly extruded or freshly formed film, still warm from the forming process, may be treated in accordance with the invention, with or without supplemental heating.

Referring now to FIG. 12, a film 10 is extruded from an extruding die 70 and passed into a cooling liquid 72 contained within a tank 74. The film passes around a guide roller 76, and 77, then between heaters 30 (which also heat film 11), thence, out of the tank and between an electrode pair 78 and 78A. A high voltage alternating current source 22 supplies electric power to the electrode pair and a corona discharge is obtained between the electrodes. A second film 11 is extruded through an extrusion die 70A, passed through cooling liquid 72A contained in tank 74A and similarly passed over guide rollers 76A and 77A. After passing over guide roller 79 film 11 comes into contact with the corona discharge simultaneously with film 10 and the treated films 10 and 11 are drawn together over drawing roll 32 to form a laminated sheet. The laminated sheet is passed over guide roller 34 to a suitable take-up reel, not shown.

It is thus seen that in accordance with the invention two or more dissimilar films are subjected to electric corona discharge and brought into contact whereby the films will adhere one to the other to form a useful laminated sheet with properties which combine the individual properties of the two films. The electric treatment may be appleid separately to the films or simultaneously or it may be applied to some but not all of the films constituting the laminate. Selective treatment of films may be obtained even with simultaneous treatment, for example in the manner shown with reference to FIG. 13. In FIG. 13 there are shown three films 10, 11 and 12, passing between electrode 18 and a grounded roller 20. The corona discharge is shown by the dotted line 19. Since film 10 is in contact with grounded roller 20, its lower surface 10A at least is not subject to the corona discharge treatment, and only films 12 and 11 are subjected to treatment on both sides.

Figure 14:
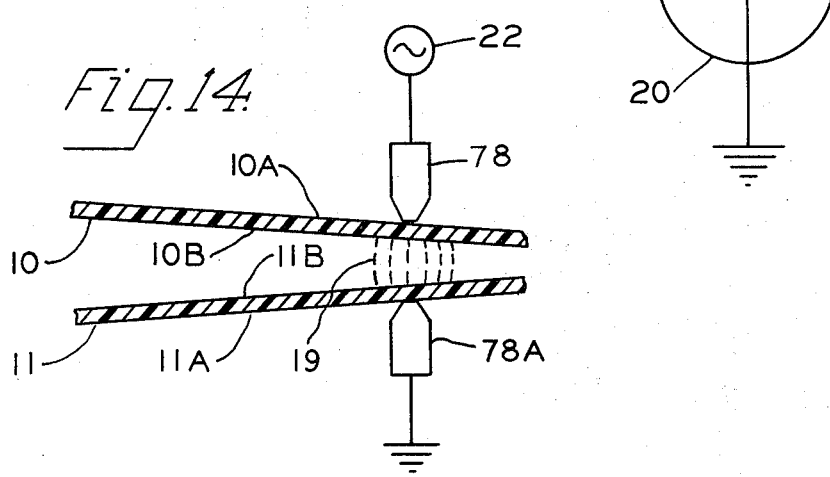
FIG. 14 is a schematic diagram in elevation showing another manner of simultaneous treatment of two plastic films in accordance with the invention.

In FIG. 14, two films 10 and 11 are shown passing through an electrode pair 78 and 78A. The outer surfaces 10A and 11A of the two films are in contact respectively, with the electrodes 78 and 78A and consequently the corona discharge treatment is effective only on the inner surfaces 10B and 11B of the two films. In short, electric corona treatment of any film surface can be avoided by placing that surface in contact with one of the electrode pair.

In general, laminated sheets in accordance with the invention may be made by treating two or more films immediately after they are extruded, in which case the films may be referred to as "co-extruded." Alternatively, one or more of the films to be treated may be freshly extruded, and another may be an "old," i.e., previously made, film, supplied from a roll. This latter type of process, consisting of bonding together the freshly extruded film with an old film, may be referred to as "extrusion coating," since the roll film is in effect coated with a freshly extruded film. As a third alternative, two or more "old" films may be treated and bonded together to form the laminated sheet. The term "extruded" is used for simplicity, although it will be appreciated that the same principles apply whether one or more of the films involved are extruded, cast, blown, or made by any other process.

Referring now to FIG. 15, the manufacture of a laminated sheet in accordance with the invention by co-extrusion is schematically illustrated. A first film 10 and a second dissimilar film 11 are concurrently extruded from a multiple extrusion die 70 and passed to a chill roll 20. The two extruded films are subjected to high intensity electric corona discharge treatment in accordance with the invention by being passed between an electrode 18 and a roll 20 which is grounded, as shown. Electrode 18 is connected to a source of alternating current 22 and a corona discharge occurs between electrode 18 and grounded roll 20. Roll 20 may also be chilled to cool the co-extruded films, but the electrode is positioned such that the corona discharge treatment is applied to the film prior to effective cooling of the film by chilled, grounded roll 20. Guide rollers 34 take the laminated sheet 72 to a take-up roll, not shown. While a multiple slit extrusion die is advantageous, naturally, separate dies, as illustrated in FIG. 12, may be used.

FIG. 16 shows schematically an extrusion coating process in accordance with the invention wherein a first film 10 is supplied from a roll 71, and a second dissimilar film 11 is freshly extruded from one slot of multiple extrusion die 70. The process may otherwise be identical to that illustrated in FIG. 15, the electric corona discharge treatment being applied by electrode 18 connected to alternating current source 22. Grounded roll 20 may be chilled to cool the laminated sheet 72 after the corona discharge treatment. In addition, a heater 14 may be employed to heat film 10 prior to the corona discharge treatment, to enhance the efficiency of the treatment. Guide rollers 34 take the laminated sheet 72 to a take-up roll, not shown.

The following examples concern laminated sheets prepared in accordance with the invention on pilot plant equipment comprising essentially a multiple slit die from which two or more sheets of film may be simultaneously extruded. The extruded film is passed through an electrode gap formed between an electrode and a grounded chill roll. Such an arrangement is schematically illustrated in FIGS. 15, 16 and 17. Referring to FIG. 17, a multiple slit extrusion die 70 is supplied from opposite sides by, respectively, extruders 80 and 81 which are mounted, respectively, on supports 80A and 81A. Hoppers 80C and 81C receive resins fed to the extruders. The die 70 is fed, respectively, by extruder heads 80B and 81B.

One or more feed rolls 71 are provided to supply pre-made film when an extrusion coating process is employed. An electrode 18 is supplied from an alternating current source 22, and a grounded roller 20 is employed adjacent the electrode 18. Roller 20 may be chilled. Take-up rolls 34 are shown.

In the case of a co-extrusion process, two or more dissimilar films are formed, by extruding the appropriate resins, through, respectively, extruder 80 and extruder head 80B, and extruder 81 and extruder head 81B, into extrusion die 70. The two dissimilar films 10 and 11 are extruded and taken up on grounded roll 20.

Referring to FIGS. 15 and 17, the hot extruded films are passed through the gap formed between electrode 18 and grounded roll 20 wherein they are subjected to a high intensity corona discharge treatment. The tension imposed on the films by the take-up rolls 34 provide the necessary bonding force between them, and the laminated film 72 formed thereby is taken by rollers 34 to a take-up roll, not shown. Roll 20 may be chilled to cool the laminated film.

In FIG. 18, there is shown a detail of the construction of the electrode 18 which simply comprises a dielectric block 18A through which is passed a chrome plated, hollow steel tube 18B. Cooling air is blown through tube 18B to prevent its overheating. Lead 18C connects tube 18B to the power source 22, not shown in FIG. 18.

The power source employed in the pilot operation is an electric generator capable of supplying up to 50 milliamps at 10,000 volts. Voltage and current into the electrode 18 may be varied between 10 and 50 milliamps and between 4,500 and 10,000 volts. The generator used is manufactured by Pillar Corporation of West Allis, Wis. Naturally, any suitable generator and electrode design may be employed. The following examples concern laminated sheets made in accordance with the invention on the above described pilot plant equipment. (The examples given earlier in the application concern laminated sheets, prepared on laboratory bench scale equipment.)

In Examples IX through XVII following, the results of the preparation of laminated sheets by both the co-extrusion and extrusion coating process on the equipment described above are tabulated.

In all cases a zero value given under the heading "Treatment intensity, watt-sec. per square inch" means that no electric corona discharge treatment was employed. A peel strength of zero given under the heading "Peel strength, grams per inch," means that the two materials did not bond together at all. A peel strength expressed as greater than ">" a given value, means that at that value of peeling force, one of the films failed, but the bond between the two films did not.

The temperature given for the extruded film is that measured at the outlet of multiple slit die 70.

On the pilot plant equipment, intensity levels of treatment great enough to exceed the upper limit of the good adhesion range for the films tested could not be reached, because running the film at speeds low enough to increase the intensity of treatment above desired levels could not be readily accomplished, as it was on the bench scale equipment. Increasing the power input to attain excessive treatment with the pilot plant equipment was limited, because of dielectric break-down.

In each of the following examples, the extruded polyethylene coating is made from type 30222 resin sold by the Chemplex Company. The polypropylene coating is made from type 7620 or 9620 resin sold by Diamond Shamrock. In all cases, a nine and one-half inch wide laminated sheet was prepared by running the film at six feet per minute and subjecting it to the intensity of treatment specified. Treatment intensity is calculated as shown in the following sample calculations, which corresponds to the first datum* given in Example IX below.

Data:
    Electric treater output voltage: 4,170 volts.
    Electric treater output current: 2.4 milliamps.
    Film width: 9½ inches.
    Film travel speed: 6 ft./min.=1.2 in./sec.

Calculations:
    Film are treated per unit time=1.2 in./sec.×9.5 in.=11.4 in.$^2$/sec.
    Wattage output=4,170 volts×2.4 milliamps=5 watts.
    Treatment intensity=5 watts/11.4 in.$^2$/sec.=0.44 watt-sec./in.$^2$.

| | Treatment intensity, watt-sec. per in.² | Laminate peel strength, grams per inch |
|---|---|---|
| Example IX—Extrusion coating of 10 mil thick nylon-6 (sold under the trademark Capran by Allied Chemical Company) with 1.5 mil thick polyethylene film extruded at 400° F | 0<br>*0.44<br>1.23<br>3.16<br>5.66 | 0<br>200<br>800<br>>1,200<br>>1,200 |
| Example X—Co-extrusion of 1.5 mil thick Nylon-6 film (made from Plaskon resins) sold by Allied Chemical Company with 1.5 mil polyethylene film, both extruded at 400° F | 0<br>2.64<br>3.50 | 0<br>650<br>>1,200 |
| Example XI—Extrusion coating of 2 mil thick biaxially oriented polyester film (sold under the trademark Hostaphan, by Kalle Aktiengesellschaft, Wiesbaden-Biebrich, Germany, Type E 5298E) with 1.5 mil thick polyethylene film extruded at 400° F | 0<br>0.29<br>1.31<br>3.29<br>7.10 | 0<br>0<br>0<br>200<br>400 |
| Example XII—Co-extrusion of 1.5 mil polyterephthalate film with 1.5 mil polyethylene film, both extruded at 450° F | 0<br>3.16 | 0<br>>1,200 |
| Example XIII—Extrusion coating of one mil thick rubberized olefinic nitrile polyolefin film (made from a resin sold under the trade name Barex 210 by the Vistron Corporation, a subsidiary of the Standard Oil Company) with 1.5 mil polyethylene film extruded at 400° F | 0.29<br>1.31<br>3.29<br>8.35 | 0<br>50<br>50<br>500 |
| Example XIV—Co-extrusion of 1.0 mil thick Barex film (as in Example XIII) with 1.5 mil thick polyethylene extruded at 400° F | 0<br>1.31<br>4.20 | 0<br>400<br>>1,200 |
| Example XV—Co-extrusion of 1.5 mil thick 1, polytetramethylene terephthalate (sold under the trade name Polyterephthalate by Eastman Kodak), and 1.5 mil polypropylene, both extruded at 400° F | 0<br>3.16<br>10.50 | 0<br>50<br>>1,000 |
| Example XVI—Extrusion coating of 7.5 mil thick polyethylene terephthalate film (sold under trade name Mylar by DuPont Chemical Co.) with 1.5 mil thick polypropylene extruded at 380° F | 2.63<br>5.25<br>7.90 | 5–10<br>150–175<br>1,000 |
| Example XVII—Extrusion coating of 10 mil thick Nylon-6 film (same as in Example IX) with 1.5 mil thick coating of polypropylene extruded at 380° F | 0<br>5.27<br>10.50 | 0<br>0<br>400–500 |

NOTE.—Except for the 10 mil thick nylon film, only intermittent contact was attained between the film and extruded coating in the extrusion coating process examples. More uniform contact would undoubtedly give even higher peel strengths. The poor contact is believed to be due to shrinkage of the thin film upon contacting the hot extrudate. This problem can be overcome by equipment refinements to more quickly and efficiently chill the laminated films.

As the foregoing examples show, by electric discharge corona treatment in accordance with the invention, polyolefin films can readily be laminated to olefinic nitrile and nylon films to form laminated sheets, both by extrusion-coating and co-extrusion techniques.

The invention has been described in detail with respect to specific embodiments thereof. It will be apparent that upon a reading and understanding of the above, alterations and modifications may be made thereto, which alterations and modifications are within the scope and spirit of the present invention. For example, while the examples given above are for films treated in ambient room atmosphere, treatment may be carried out in an oxygen-rich atmosphere, a rare gas or nitrogen atmosphere, or any atmosphere selected to meet the particular ends desired. It is intended to include all such alterations and modifications within the the scope of the appended claims or the equivalents thereof.

What is claimed is:

1. A laminated sheet of plastic comprising at least two dissimilar films bonded one to the other, the adhesion of said films one to the other being enhanced by electrical corona discharge treatment applied to at least two of said films prior to bringing the treated surfaces of said films together under pressure, wherein one of said films is polypropylene treated to a contact angle with distilled water of between about 40° and about 60° and another of said films is a rubberized acrylonitrile-olefinic ester copolymer, treated to a contact angle with distilled water of between about 38° and about 50°.

2. The laminated sheet of Claim 1 wherein said polypropylene is treated to a contact angle with distilled water of between about 45° and about 55° and said acrylonitrile film is treated to a contact angle with distilled water of between about 38° and about 40°.

3. A laminated sheet of plastic comprising at least two dissimilar films bonded one to the other, the adhesion of said films one to the other being enhanced by electrical corona discharge treatment applied to at least two of said films prior to bringing the treated surfaces of said films together under pressure, wherein one of said films is poleythylene treated to a contact angle with distilled water of between about 10° and about 60°, and another of said films is a rubberized acrylonitrile-olefinic ester copolymer treated to a contact angle with distilled water of between about 38° and about 64°.

4. The laminated sheet of Claim 3 wherein said polyethylene is treated to a contact angle of between about 10° and about 55° and said acrylonitrile is treated to a contact angle with distilled water of between about 38° and about 64°.

5. The method of laminating a polypropylene film with an olefinic nitrile polymer film, comprising subjecting said films to an electric corona discharge treatment and bringing said films together under pressure, wherein said polypropylene film is treated to a contact angle with distilled water of between about 40° and about 60° and said olefinic nitrile film is a rubberized acrylonitrile-olefinic ester copolymer treated to a contact angle with distilled water of between about 38° and about 50°.

6. The method of Claim 5 wherein said polypropylene film is treated to a contact angle with distilled water of between about 45° and about 55° and said olefinic nitrile film is treated to a contact angle with distilled water of between about 38° and about 40°.

7. The method of laminating a polyethylene film with an olefinic nitrile polymer film, comprising subjecting said films to an electric corona discharge treatment and bringing said films together under pressure, wherein said polyethylene film is treated to a contact angle with distilled water of between about 10° and about 60° and said olefinic nitrile film is a rubberized acrylonitrile-olefinic ester copolymer treated to a contact angle with distilled water of between about 38° and about 64°.

8. The method of Claim 7 wherein said polyethylene contact angle is between about 10° and about 55° and said acrylonitrile contact angle is between about 38° and about 64°.

References Cited

UNITED STATES PATENTS

| | | | |
|---|---|---|---|
| 3,081,214 | 3/1963 | Strome | 156—272 |
| 3,371,002 | 2/1968 | Reddeman | 156—244 |
| 3,453,173 | 7/1969 | Isley et al. | 161—190 |
| 3,426,102 | 2/1969 | Solak et al. | 260—879 |
| Re. 26,110 | 11/1966 | Harrison et al. | 161—412 X |
| 2,864,755 | 12/1958 | Rothacker | 117—93.1 CD X |
| 3,274,089 | 9/1966 | Wolinski | 117—93.1 CD X |
| 3,360,412 | 12/1967 | James | 156—272 X |
| 3,423,231 | 1/1969 | Lutzman | 161—254 X |
| 3,498,865 | 3/1970 | Paquin et al. | 156—244 |
| 3,570,748 | 3/1971 | Coyle et al. | 161—227 X |

FOREIGN PATENTS

| | | | |
|---|---|---|---|
| 731,605 | 4/1966 | Canada | 156—272 |

CHARLES E. VAN HORN, Primary Examiner

D. A. SIMMONS, Assistant Examiner

U.S. Cl. X.R.

156—244, 272, 306; 161—412